United States Patent [19]

Benn

[11] Patent Number: 5,183,572
[45] Date of Patent: Feb. 2, 1993

[54] CROSS-FLOW FILTRATION SYSTEM AND METHOD FOR FILTERING A SOLVENT-PARTICULATE WASTE STREAM

[75] Inventor: James A. Benn, Arlington, Mass.

[73] Assignee: Curtis Manufacturing Company, Inc., Jaffrey, N.H.

[21] Appl. No.: 749,302

[22] Filed: Aug. 23, 1991

[51] Int. Cl.⁵ ............................................. B01D 61/00
[52] U.S. Cl. .................................. 210/650; 210/651; 210/652; 210/790; 210/800; 210/805
[58] Field of Search ............... 210/650, 651, 652, 790, 210/800, 202, 805, 295, 195.2, 195.1, 321.83

[56] References Cited

U.S. PATENT DOCUMENTS

| | | | |
|---|---|---|---|
| 4,426,293 | 1/1984 | Mason et al. | 210/195.2 |
| 4,678,477 | 7/1987 | The et al. | 210/650 |
| 4,689,153 | 8/1987 | Follmann et al. | 210/195.2 |
| 4,738,781 | 4/1988 | Word et al. | 210/195.2 |
| 4,774,002 | 9/1988 | Gutman et al. | 210/195.2 |
| 4,810,389 | 3/1989 | Mallory | 210/650 |
| 4,886,603 | 12/1989 | Taylor | 210/641 |
| 4,956,093 | 9/1990 | Pirbazari et al. | 210/650 |
| 5,096,591 | 3/1992 | Benn | 210/321.83 |

FOREIGN PATENT DOCUMENTS 18228  4/1987  Japan .................................. 210/790

OTHER PUBLICATIONS

Schweitzer, P. A., Handbook of Separation Techniques for Chemical Engineers, pp. 2-3 to 2-5, Section 2.1.

Primary Examiner—Robert A. Dawson
Assistant Examiner—Ana Fortuna
Attorney, Agent, or Firm—Richard P. Crowley

[57] ABSTRACT

A system and method for the filtration of a solvent-particulate waste stream, such as a water solvent-particulate waste stream derived from the washing of a printing press blanket. The system and method include pumping and circulating under pressure the waste stream from a processing container through a filter to provide for a clarified solvent stream for reuse and a concentrated waste stream which is recycled back to the processing container. The system and method also include maintaining the recirculation flow rate at least than about 0.05 gallons per minute per square foot of filter surface (GFD) and removing a clarified solvent stream at a rate of less than about 2-3 gallons of flux per square foot of filter surface per day, while maintaining the pressure in the filter at a pressure of greater than about 25 psi and recycling the clarified solvent stream back for reuse in the system.

18 Claims, 2 Drawing Sheets

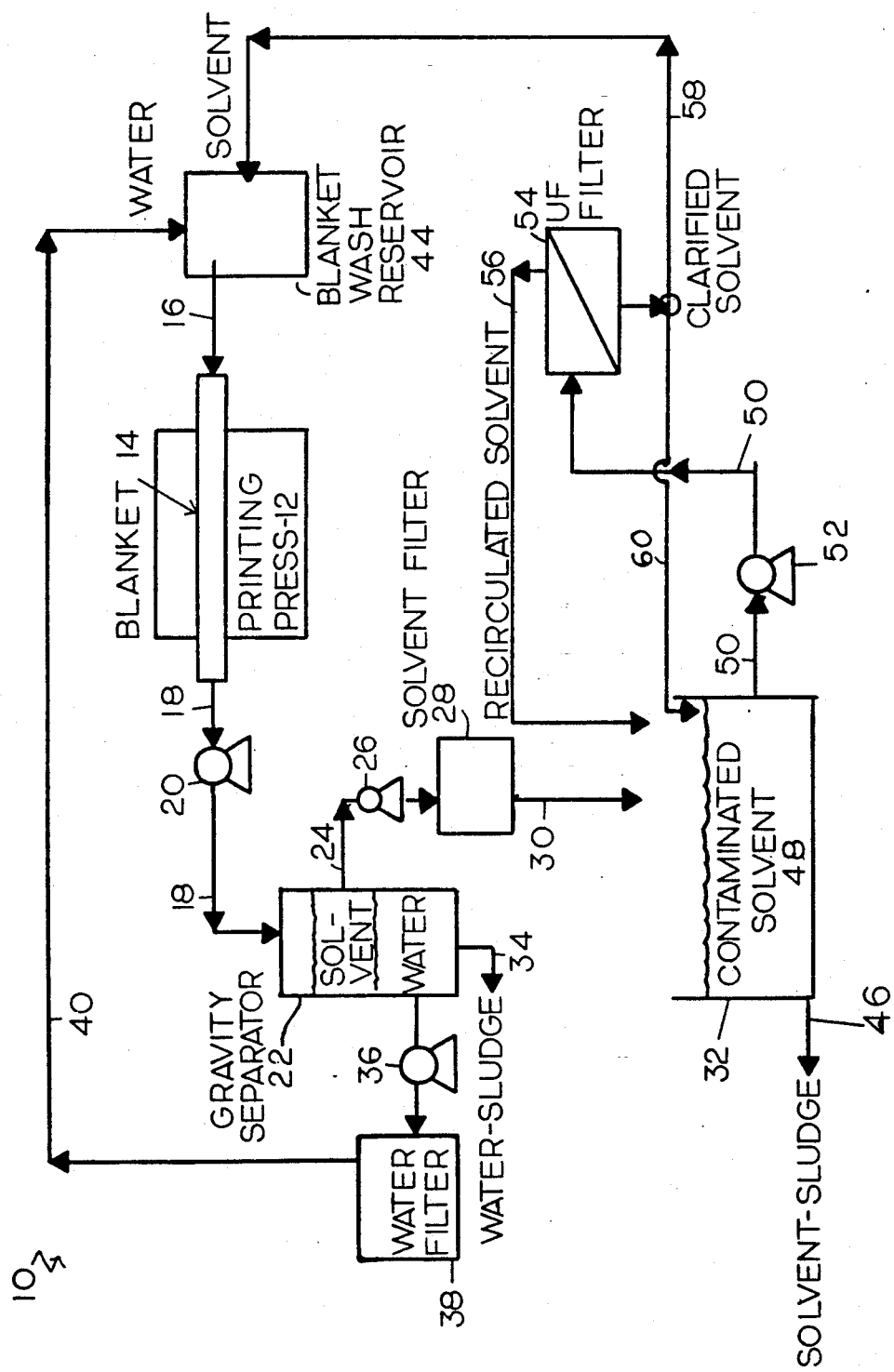
FIG. I

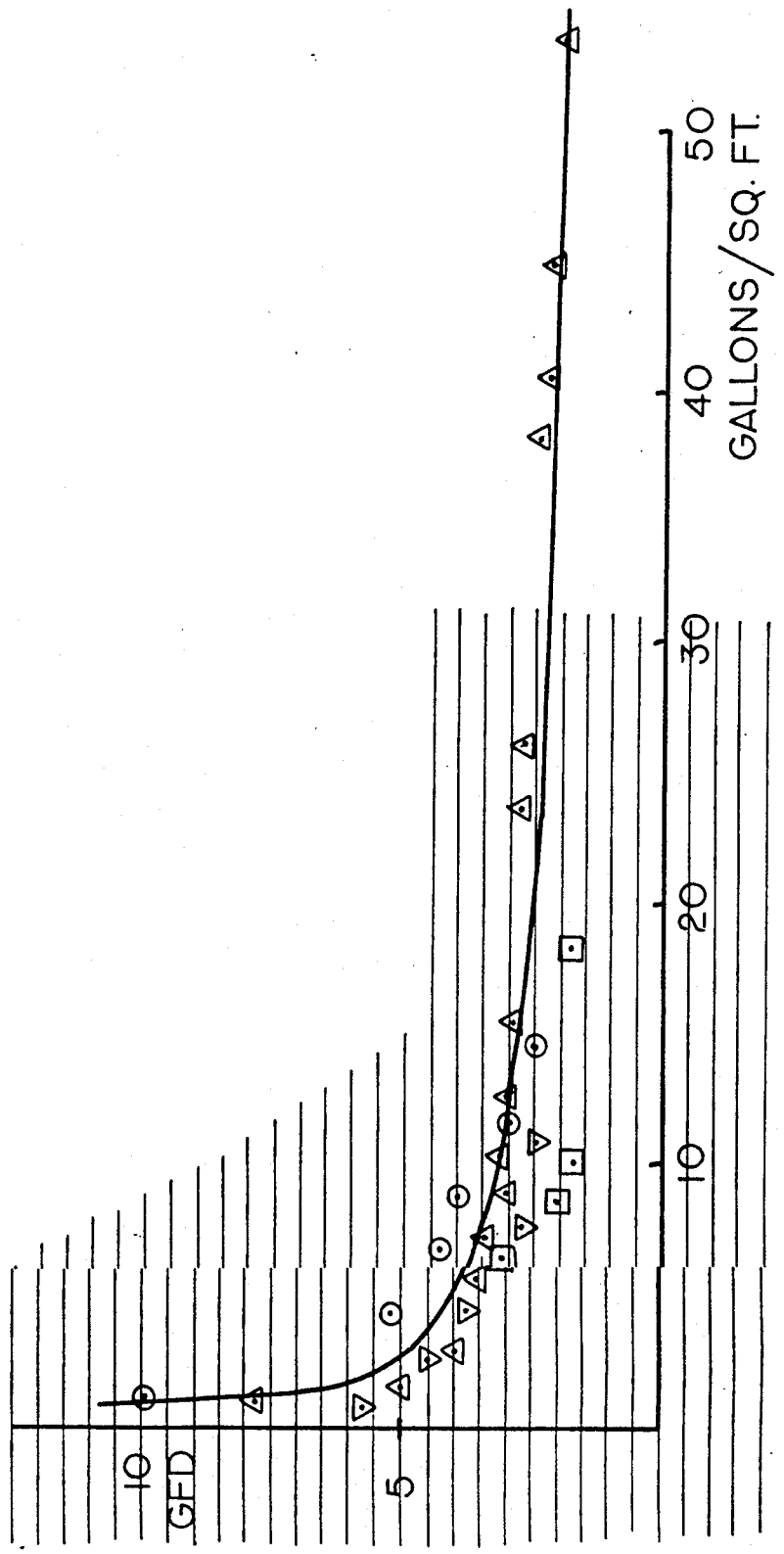

CROSS-FLOW FILTRATION SYSTEM AND METHOD FOR FILTERING A SOLVENT-PARTICULATE WASTE STREAM

BACKGROUND OF THE INVENTION

A wide variety of organic solvents, such as, but not limited to: petroleum solvents; halogenated hydrocarbons; aromatic and aliphatic hydrocarbons; ethers, esters and mixtures thereof, are used for treating or cleaning fabricated parts, for cleaning metal surfaces before painting, cleaning of painting equipment, cleaning of clothing and in particular, in one embodiment, solvents are employed for the removal of ink and other particulates from solvent-based wash solutions, such as for cleaning components of printing presses, like blankets, that come in contact with inks.

For example, during printing on offset presses, the printing cylinder blankets can accumulate foreign matter, such as dried ink or ink build-up, paper, lint, clay, dirt and the like, which must be removed to maintain quality printing. As a result thereof, during a specific run or printing job, the blankets must be cleaned at various times. The blankets also must be cleaned to remove the image when a particular printing job is completed. For this purpose, blanket washers are utilized which spray mixtures of water, cleaning solvents, and wetting agents onto the printing cylinder blanket to effect the cleaning operation.

Since the waste effluent from such blanket washers consists of solvent and water, as well as the foreign matter removed from the blanket, it is highly toxic and cannot be discharged to the sewer. The transportation and disposal of such materials as a hazardous waste is becoming increasingly more expensive. Moreover, since the solvents used in the cleaning operation are relatively expensive, it is desirable to reclaim the solvents for reuse.

One method used in reclamation of solvents from the waste effluent of printing blanket washers has utilized large gravity settling tanks and carbon bed filters. The waste effluent is accumulated in the settling tank in order to permit the solvents, which typically are hydrocarbon or petroleum based, to rise to the top, and the water then is bled from the bottom of the tank and passed through one or more of the carbon bed filters which absorb and remove remaining solvent and other organic contaminants in the water prior to draining. The solvent similarly is directed through such filter beds for removing impurities. Not only are such settling tanks and filter beds relatively bulky and expensive, they often have been problem prone and ineffective. Because of surfactants and wetting agents used with the cleaning solvents in the blanket washing operation, the resulting waste effluent frequently is an emulsion of the water and solvent that does not readily separate in the settling tank, which in turn can impede the effectiveness of the carbon bed filters. As a result, the clarified water still may retain such high levels of solvent as to prevent its direct discharge to the sewer. Continued use of contaminated solvents, furthermore, can result in clogging of the filter beds and costly shutdowns, maintenance and clean up. While various distillation techniques are available for separating solvents from waste effluents, such systems are expensive and complicated, energy inefficient and require heating that can create safety hazards.

Various solvents containing particulates are cleaned by passing them through filtration materials that has a pore size equal to or generally less than 0.2 microns in diameter. These filters hold back the particles and large molecules, while allowing the clarified solvents in the permeate to pass through the small pore sizes. With these small pore sizes, the filters clog very quickly unless a cross flow of fluids is employed. Generally, the cross flow of fluid runs parallel to the filter membrane surface and acts to scrub the filter membrane surface free of trapped particulate matter, and thereby allows the filter pores to remain open sufficiently to permit clarified solvent to pass through the filtration membrane material. This method of liquid solvent clarification is well known in the process filtration industry and is used extensively for the cleaning of water and water-based solutions, and is generally referred to as ultrafiltration or cross flow microfiltration. For example, a method and apparatus for separating water and water-soluble substances from hydrocarbons and halogenated hydrocarbons employing filters is disclosed in U.S. Pat. No. 4,886,603, issued Dec. 12, 1989.

It is desirable to provide for a new, improved, effective system and method for the cleaning of particulate and solvent waste solutions, particularly, but not limited to, solvent-water-particulate wash solutions used for cleaning components of printing presses.

SUMMARY OF THE INVENTION

The invention concerns a solvent filtration system and method that does not provide for heating the solvent being processed to a dangerous temperature level and also to provide a system and method that is able to produce a highly clarified solvent with the use of an inexpensive filter material, which clarified solvent is capable of being reused.

The invention involves a method and system for filtering of a solvent-particulate waste stream of any source, but particularly a printing source, to produce a clarified solvent stream for reuse and a solvent-particulate stream for removal. In general, the method and system comprises directing a solvent-particulate waste stream into a processing container for treatment of the waste stream and pumping and recirculating the solvent-particulate waste stream from the processing container under pressure through an filter, typically, a micro or an ultrafilter having a pore size of 0.2 microns or less, and in which the pores of the membrane are saturated or plugged with the same or a miscible solvent for removal of a filtrate or permeate portion of the waste stream as a clarified solvent stream and the production of a concentrated waste stream which is recycled back to the processing container.

The system and method require as an essential step maintaining the recirculating flow of the waste stream at less than about 0.05 gallons per minute per square foot (GPM/sqft) of filtration surface area, such as for example, from about 0.01 to 0.04. The method also includes removing the clarified solvent stream from the filter at a low rate, for example, a rate of less than about three gallons of flux per square foot of filter surface per day (GFD), such as for example, less than about two GFD.

The system and method also critically include maintaining the pressure in the filter at a defined pressure level, for example of greater than about 25 psi, for example, 30 to 40 psi, and recycling and non-use of the filtrate during a defined time period before removing a clarified solvent stream for reuse. Typically, the defined time period would be a time sufficient for the solvent in the solvent waste stream to plug at least partially the pores of the filter on start up and/or to produce a clarified solvent stream suitable for reuse, with such time typically found to be greater than about 10 minutes, for example, typically 15 to 30 minutes, after start up. There are also feed streams to be separated wherein little or no recycling is required to obtain a clarified solvent stream. The system and method also include adding continuously the solvent-particulate waste stream to the processing container and removing continuously a clarified solvent stream from the filter for reuse, generally for recycling for reuse as a cleaning solvent alone or mixed with water in connection with the cleaning of a printing blanket. The method includes disposing periodically of accumulated particulate solvent and accumulated, where applicable, particulate water-sludge material.

The method and system outlined in the processing parameters, that is, the filtration pressure, the flow rate of the solvent stream, the flow rate of the waste stream, the time period of filtration after start up, all provide in combination significant advantages over the present systems and methods for clarifying and separating solvent from a waste solvent-particulate mixture.

Where the system and method are employed in connection with the separation and clarification of an aqueous, solvent-particulate waste stream from the treating of a printing press blanket, the system and method include providing a water solvent-particulate waste stream from the washing of the printing press blanket and removing water from the waste stream, for example by gravity separation or other means, to provide a water-particulate stream for discharge and a solvent-particulate stream for filtering, and thereafter filtering and subsequent recycling a clarified solvent stream into the printing press blanket washer apparatus for reuse.

A wide variety of filtration devices may be employed in connection with the invention, such as, but not be limited to a spirally wound filter cartridge, such as a filter cartridge as described and illustrated in U.S. patent application Ser. No. 07/580,955, filed Sep. 11, 1990, hereby incorporated by reference in its entirety. Such filter cartridge is adapted to be inserted within a filter container and includes a perforated center tube for the withdrawal of a waste solvent stream and provides a spirally wound membrane loop sheet material for the separation of the waste feed stream into a waste solvent concentrate stream and a clarified solvent or permeate stream, with the membrane sheet material forming a closed loop at the one and at the other end of the membrane sheet material which is wrapped spirally about the center tube. The filter cartridge includes first and second porous open spacer sheet materials to separate the spirally wound membrane sheet material, the first spacer sheet material within the closed loop of the membrane sheet to form a spirally wound clarified solvent flow channel, and the second spacer sheet material outside of the closed loop membrane to form a spirally wound waste concentrate or waste solvent flow channel. A tangentially elongated feed inlet is formed on the exterior cylindrical surface of the filter cartridge. The filter cartridge includes first and second headers at the one and the other end, a concentrate solvent-sludge outlet means at one end of the center tube and which includes a permeate or clarified solvent outlet in the closed loop extending through the first or second header, or both, for the withdrawal of a clarified solvent stream.

In accordance with a further aspect of the invention, a method is provided for converting a conventional filtration unit having a water permeate layer into a hydrocarbon-based solvent filtration unit. To this end, an filtration unit with a conventional water permeate filter membrane may be continually rinsed with a solvent, herein sometimes referred to as a co-solvent, like an alcohol like isopropyl alcohol, that is miscible both with water and the hydrocarbon-based solvent with which the filter unit ultimately is to be used. Such rinsing is continued until substantially all of the water within the pores of the membrane are dissolved with and replaced by the co-solvent. Thereafter, the filter is rinsed with a hydrocarbon-based solvent until substantially all of the co-solvent is dissolved in and replaced by the hydrocarbon-based solvent and the hydrocarbon-based solvent substantially fills and saturates the pores of the membrane.

In practice, it has been found that an filtration unit having a conventional water permeate ultra or microfilter membrane, such as the commercially available membrane referred to above sold by Romicon Corp. may be converted to a hydrocarbon-based solvent permeate filter by first rinsing the filter with isopropyl alcohol so as to cause the isopropyl alcohol to dissolve with the water in the porous membrane. The isopropyl alcohol then is drained from the filter, and the filter again is rinsed with isopropyl alcohol. This procedure is repeated on the order of ten times until substantially all of the water within the pores of the filter membrane have been dissolved by the isopropyl alcohol, and the isopropyl alcohol substantially saturates the pores. The filter membrane then is rinsed with a hydrocarbon-based solvent, such as type 1910S manufactured by Anchor Lithkemko, so as to cause the isopropyl alcohol within the pores of the filter membrane to become dissolved in the hydrocarbon-based solvent. The hydrocarbon-based solvent then is drained from the filter, and the procedure is repeated on the order of ten times until the hydrocarbon-based solvent has dissolved and replaced substantially all of the isopropyl alcohol within the pores of the filter membrane and the membrane is saturated substantially with the hydrocarbon-based solvent. The filtration unit then is in condition for use in the solvent recovery system.

It is believed that during operation of such converted filtration unit, the hydrocarbon-based solvent within the pores of the filter membrane will tend to attract and permit permeation of hydrocarbon-based solvents within the feed zone of the filter by reason of the surface tension of such miscible liquids, while at the same time repel and provide an effective barrier to water and other foreign matters that are not miscible with the permeate layer. The pores of the filter membrane preferably should be small enough to permit such permeation to occur under the pressure in the feed zone.

Initially, systems and filters were purchased for solvent clarification that were designed to filter water. This equipment only partially clarified solvents and was unsatisfactory for several other reasons. Firstly, the recirculation pump added energy to the solvent, heating it up beyond its flash point producing a hazard of fire and explosion. Secondly, the filter material used in the filter could not be cleaned through use of any methods normally used in systems designed to filter water. Therefore, the production rates of clarified solvent and the lifetimes of filter elements were far below those seen in the clarification of water. Thirdly, it was found that in order to fully clarify solvents, it was necessary to use filter material that had very small pores and thus was very expensive. These filters typically had pores that could remove all particles larger than 50,000 molecular weight, and cost between $25 and $35 per square foot.

After extensive experimentation with different pumps and filters, it has been discovered surprisingly that the rate of cross flow needed by solvent filters was far less than anticipated. Generally, in water clarification systems, the cross flow or recirculation rate is from 2.0 to 0.2 GPM/sqft filter surface area. The clarified water production rate generally begins at 200 GFD and gradually falls to 20 GFD over a 24-hour period. At this point, the filters are generally washed, thus increasing their clarified water production rate for another 24-hour or defined period of running. If the filters are run longer than 24-hours or a defined period without washing their production rate falls close to zero.

It was discovered unexpectedly that for solvent systems, the cross flow needed by filters could be as low as 0.02 GPM/sqft without any degradation in the production rate of clarified solvent. This flow rate is from 10 to 100 times less than that needed in water systems, and allows a much smaller recirculation pump to be used. The smaller pump adds very little heat to the solvent, thus allowing the solvent to remain near room temperature, 20° C. to 25° C., during clarification. This means the system is safe to operate because the solvents being processed are kept well below their flash point.

It was also found that as with water filtration systems, the solvent production rate of the filters began at high levels and dropped dramatically after 24 hours. However, unlike water filtration systems, the production rate stabilized and then only very slowly dropped over a long time. Since the filter material for solvent clarification has such a short lifetime when compared to water filters, it is desirable to locate very inexpensive filter material, in the rage of $2.00 per square foot. These filter materials however typically have relatively large pores, in the 0.2 micron range. When the filter material of this pore size was first used, it did not fully remove the inks from the feed solvent stream. After extensive experimentation, however, a way was discovered to use the filter materials to achieve the same high clarity as with the finer pore, more expensive filter materials. It was found that if 10 psi was used to drive the solvent through the inexpensive filter material, incomplete removal of the inks from the solvents was achieved. The initial contaminated solvent was black and opaque, the reclaimed solvent was the color of a "cola" soft drink due to ink residue remaining within the clarified solvent. If 20 psi was used, the clarified solvent produced was somewhat lighter in color. If 30 psi were used, the solvent being produced was initially the color of "cola", but within 10 to 15 minutes, the color of the reclaimed solvent became clear, about the color of a "ginger ale" soft drink. This color was very close to the color achievable with the expensive and smaller pore filter material.

Thus, it was discovered that satisfactory solvent clarification could be achieved with inexpensive filter materials through the use of a defined low pressure, e.g., about 25-30 psi pressure across the membrane, and through allowing the filter element to reclaim solvent for a short time period, e.g., about 15 minutes, or from 10 to 30 minutes, before collecting the reclaimed solvent. If the filtration system was turned off and then turned back on after 30 minutes, the initial clarified solvent produced was again dark like "cola", but would again clear up satisfactorily upon again running for about 15 minutes. While not wishing to be bound by any particular theory of operation, it is believed that the filter material becomes partially plugged during the initial minutes of operation, thus making the pores in the filter material smaller, thus removing more contaminants from the solvent being clarified. When the system is turned off, the pores apparently become unclogged, and must be again partially replugged upon start-up to achieve satisfactory solvent cleaning.

Therefore, a system and method has been discovered in one embodiment for the clarification or removal of particulate and large molecules from solvents. The recirculation flow rate should be kept at or below about 0.05, e.g. about 0.02 GPM/sqft of filter surface area. The system should also be designed so that the clarified solvent production rate will be in the range of one to three GFD. The filter material should be expected to only have a life of 50 gallons of clarified solvent production per square foot of filter surface area. This is from 10 to 100 times shorter lifetimes than those experienced with water systems where the filter elements are washed between uses. Also, the pressure used to drive the solvent through the filter material should be in the range of 25 to 35 psi, and the clarified solvent should not be collected for reuse until the filter element has been allowed to run to produce a clarified solvent, such as for about 15 minutes, or to plug partially the membrane and produce a cleaner, clarified solvent stream.

The system and method will now be described for the purposes of illustration only in connection with certain embodiments; however, it is recognized that those persons skilled in the art may make various changes, modifications, additions and improvements to the illustrated system and method without departing from the spirit and scope of the invention.

BRIEF DESCRIPTION OF THE DRAWINGS

FIG. 1 is a schematic illustration of the system and method of the closed loop recirculation filtration system for the treatment of a solvent-particulate waste effluent from a printing press.

FIG. 2 is a graphical plot of data taken of several different filtration type materials plotted as gallons per day per square foot of filtration surface area (GFD) versus the total gallons of clarified solvent produced per square foot of filtration material (gallons/sqft).

DESCRIPTION OF THE EMBODIMENTS

With reference to FIG. 1, there is shown a printing press blanket waste recovery system 10 wherein a printing press has a blanket 14 to be cleaned by the introduction of a cleaning solution through a conduit 16, the cleaning solution typically comprising a petroleum solvent, such as for example, an aliphatic hydrocarbon, xylene and a glycol monoether, together with various wetting agents and surfactants. This cleaning solution is sprayed onto the blanket 14, then the waste effluent solution comprising water, solvent and particulate material from the printing press blanket 14 is removed by a pump 20 through line 18 and introduced into a gravity separator tank 22, wherein the solvent and water are allowed to separate by gravity. A pump 26 removes the waste solvent and some particulate material through conduit line 24 by pump 26 through a solvent filter 28 to remove particulate material and introduces the waste-contaminated solvent through line 30 into processing treating tank 32 containing contaminated solvent 48.

After operation of the system 10 for a period of time, residual solvent and waste are removed from the treatment tank 32 through line 46 as sludge waste to be discarded. Contaminated solvent 48 is withdrawn by pump 52 through conduit 50 and introduced into a filtration device, such as a spirally wound device having pores of 0.2 mean micron size, the pores being saturated with a hydrocarbon-solvent. The concentrate stream from the UF filter 54 is recycled as recirculated solvent through line 56 and reintroduced back into the processing tank 32, while a clarified solvent stream suitable for reuse is removed through conduit 58 and introduced into a blanket wash reservoir 44 where it is optionally admixed with water and reused in cleaning the printing press blanket 14 on the printing press 12.

Some water and mostly heavy sludge material are removed through the conduit 34 from the gravity separator 22, while the waste water is pumped by pump 36 through a conduit to a water filter 38 for the removal of any particulate matter, and then the filtered water recycled through line 40 as reusable water back to the blanket wash reservoir 44, where optionally it is again mixed with the clarified solvent for reuse in cleaning the blanket 14 of the printing press 12 or for other reuse, discharge or reclamation.

There is thus described and illustrated in FIG. 1 a completely recyclable closed loop system and method for recovering and reuse of clarified solvent. While the system is described in particular in connection with a water-solvent-particulate matter, it is recognized that the system without the employment of a gravity separator or water filter may also be employed for the separation of solvent in particulate-solvent streams alone, which streams do not contain water or very minor amounts of water. Thus, the system and method may be employed in clarifying particulate-solvent streams from a wide variety of solvent-based cleaning operations.

A typical automatic printing press blanket 14 washer is used once per hour to clean the printing blankets of the press 12 while the press is still running in order to maintain printing quality without need to stop and manually clean the press.

During a washing cycle, about 0.05 gallons of wash solvent and 0.025 gallons of water are removed from reservoirs in the blanket washing system and mixed together to produce a washing solution which is sprayed onto a rotating brush. This rotating brush is then lowered on the spinning printing press blanket acting to scrub the blanket clean. The brush is in a housing which contains a flicker bar that makes the brush flick solvent and waste inks, clay and paper linters into a trough for collection. This waste stream flows by gravity to a collection tank which in turn transfers the waste into a gravity separator. Over a 16-hour work day, about two gallons of waste solvent and one gallon of waste water reach the gravity separator. The rest of the solvent and water are lost to evaporation.

The solvent and water separate by gravity in the gravity separator 22. When about 0.5 gallons of water have been added to the separator, this amount is pulled off the bottom of the separator by use of a small pump 36 and float switch and returned through a water filter 38 to the water reservoir 44 in the blanket washer system. When an equivalent amount of solvent is added to the separator 22, this amount is pulled off the top of the separator by pump 26 through a prefilter 28 to the solvent recovery system process tank 32.

More particularly, with reference to FIG. 1, in one example when about two gallons of waste-contaminated solvent have been added to the solvent recovery system process tank 32, the solvent recovery system pump 52 turns on and this pump recirculates the waste solvent through the filter 54 under pressure at from 0.25 to 0.5 gallons per minute, depending upon the size of the system. The filters mounted on the system generally hold from 10 to 40 square feet of filter surface area. This recirculation action causes the UF filter 54 to generate clarified filtered solvent at the rate of about three gallons per day per square foot of filter surface area in the described system.

During the first 15 minutes of operation or as required until the filtered solvent appears relatively clear in color, the filtered solvent is returned to the process tank 32 through line 60. After 15 minutes of running, the filtered, clarified solvent has become quite clear, i.e. is a clarified solvent, and is then rerouted through line 58 to the solvent reservoir 44 of the blanket washer system for reuse.

The solvent recovery system holds about 55 gallons of waste solvent. When about 1,000 gallons of solvent have been reclaimed, the wastes build up in the process tank 32 to a point where the filters stop generating an adequate flow of clarified solvent. At this time, the waste in the process tank 32 is emptied via conduit 46 into a 55 gallon drum for disposal, and the process tank 32 is again allowed to fill with waste solvent to be reclaimed. Where the filter 54 contains 20 square feet of surface area, the UF filter will begin producing clarified solvent at upwards of 200 gallons per day. Quickly, however, the output falls to the rate of about 60 gallons per day, where it very slowly falls during the production of about 1,000 gallons of clarified solvent. After about 1,000 gallons have been reclaimed, the production rate of the UF filter 54 has fallen generally to about the rate of 10 gallons per day, and it is recommended that the UF filter be replaced at this time. The water and solvent reservoirs 44 of the blanket washer system 10 are occasionally replenished with water and new solvent to make up for that amount lost to evaporation.

FIG. 2 is a graph of data taken with several different filter materials plotted as GFD versus total gallons of clarified solvent produced per square foot of filter material, i.e. gallons/sqft. As can be seen from the date in FIG. 2, the filtration membrane began producing solvent at over 10 GFD. After about 10 gallons/sqft were produced, the rate had dropped to about three GFD. After 20 gallons/sqft were produced, the flow rate had dropped to 2.5 GFD, and after 50 gallons/sqft, the flow rate had dropped to only 2 GFD. Therefore, the majority of degradation in the filter element production occurs over the first 20% of the filter life, and after that, only a minimum of degradation in production rate is experienced. Thus, the solvent filtration systems should be designed so that their expected flow rates would be in the range of 2-3 GFD or less and the expected filter life would be in the range of 50 gallons/sqft. Also, there would need to be no provision for regenerating a filter element through washing. The filter element would be used until its flow rate dropped below acceptable levels, then replaced with a new filter element. This is in contrast to the filter elements used for water clarification which have lifetimes achieved through rewashing in excess of 500 to 5,000 gallons/sqft.

What is claimed is:

1. A method for the filtering of a solvent-particulate waste stream into a clarified solvent stream and a solvent-particulate stream, which method comprises:
   a) directing a solvent-particulate waste stream into a processing container for treatment;
   b) pumping under pressure the waste stream from the processing container through a filter for the removal of a filtrate portion of the waste stream as a clarified solvent stream and recirculating at least a portion of a concentrated waste stream back to the processing container;
   c) maintaining the recirculating flow rate of the waste stream at less than about 0.05 gallons per minute per square foot (GPM/sqft) of filter surface area;
   d) removing the clarified solvent stream from the filter;
   e) adding continuously solvent-particulate waste stream to the processing container;
   f) removing continuously a clarified solvent stream from the filter for reuse in the cleaning operation; and
   g) disposing periodically of accumulated particulate-solvent sludge material in the processing container when a high level of particulate and a lower level of solvent remains in the processing container.

2. The method of claim 1 which includes recycling all or a part of the filtrate portion of the filter after each startup of the filter to the processing container for a defined time period or until a clarified solvent stream is produced suitable for reuse.

3. The method of claim 1 which includes maintaining the recirculating flow rate of the waste stream in the range of about 0.02 to 0.04 GPM/sqft.

4. The method of claim 1 which includes maintaining the pressure in the filter in the range of about 25 to 35 psi.

5. The method of claim 1 which includes recycling the clarified solvent stream from the filter to the processing container after each startup of the filter, to allow the clarified solvent stream to reach the desired level of clarity.

6. The method of claim 1 which includes replacing the filter after producing about 50 gallons of the clarified solvent stream per square foot of filter surface area.

7. The method of claim 1 wherein the filter has a pore size of about 0.2 microns or less.

8. The method of claim 1 wherein the waste stream comprises a waste water-solvent-particulate effluent stream from the solvent washing of a printing press blanket.

9. The method of claim 1 which includes removing accumulated particulate and solvent from the processing container when about 95% by volume of the clarified solvent has been filtered.

10. The method of claim 1 which includes employing a spiral wound cross-flow filter having a pore size of about 0.2 microns or less with the pores saturated with a solvent compatible with the solvent to be clarified.

11. The method of claim 1 which includes prefiltering the solvent-particulate waste stream to remove particulate material prior to introducing the solvent-particulate waste stream into the processing container.

12. The method of claim 1 which includes:
   a) providing a water-solvent-particulate waste stream from the washing of the printing press blanket;
   b) removing water from the water-solvent-particulate waste stream by gravity separation to provide a separated particulate-water stream and a solvent-particulate stream;
   c) filtering the separated water stream to remove particulate material;
   d) optionally recycling the separated, filtered water stream for reuse in the washing of the printing press blanket; and
   e) continuously directing the solvent-particulate waste stream from the gravity separator into the processing container of claim 1 for treatment.

13. The method of claim 1 which includes maintaining the pressure in the filter at a low pressure of greater than about 25 psi.

14. The method of claim 1 which includes removing the clarified solvent stream from the filter at a rate of less than about 3 gallons of flux per square foot of filter surface area per day (GFD).

15. The method of claim 1 which includes maintaining the clarified solvent stream at a temperature of about 20° C. to 25° C.

16. The method of claim 1 wherein the solvent-particulate waste stream is derived from a solvent-cleaning operation.

17. The method of claim 1 which includes employing a filter cartridge in a filter container, and which filter cartridge includes a perforated center tube, for the withdrawal of the concentrated waste stream recycled back to the processing container, and includes a spirally wound membrane sheet material, for the separation of the waste stream into a clarified solvent stream, the membrane material forming a closed loop at the one end and at the other end of the membrane material, the membrane material wrapped spirally about the center tube, and includes first and second porous, open-spaced, sheet materials, to separate the spirally wound membrane sheet material, the first space of sheet material within the closed loop of the membrane sheet, to form a spirally wound, clarified solvent flow channel, and the second space of sheet material outside of the closed-loop membrane, to form a spirally wound, concentrated waste stream channel.

18. A method for the filtering and reuse of a water-solvent-particulate waste stream derived from the cleaning of a printing press ink blanket by a water-solvent stream, which method comprises:
   a) washing a printing press blanket with a water-solvent stream to provide a water-solvent-particulate waste stream;
   b) pumping the waste stream into a gravity separator means to provide for the gravity separator of the water and solvent into a lower, water-particulate portion and an upper, solvent-particulate portion;
   c) pumping the water-particulate portion from the gravity separator through a water filter and the filtered water recycled to a blanket wash reservoir for reuse in washing the printing press blanket;
   d) pumping the solvent-particulate portion from the gravity separator through a solvent filter to provide a contaminated solvent stream;
   e) introducing the contaminated solvent stream into a processing container;
   f) pumping at a pressure of greater than about 25 psi the contaminated solvent stream from the processing container through a filter having a pore size of about 0.2 microns or less to provide a filtrate of a clarified solvent stream, while maintaining the flow rate of the contaminated solvent stream at less than about 0.05 gallons per minute per square foot of filter surface area;

g) recycling after each startup of the filter the filtrate portion of the filter to the processing container for a period of time until the filtrate portion is relatively clear in color and suitable for reuse;

h) removing the clarified solvent stream from the filter at a rate of less than about 3 gallons of flux per square foot of filter surface area per day;

i) adding contaminated solvent stream to the processing container;

j) recycling the clarified solvent stream from the filter to the blanket wash reservoir for reuse in the washing of the printing press blanket; and k) disposing periodically accumulated particulate-solvent sludge material from the processing container thereby providing for a closed loop recycling filtration method for a waste stream from a printing press blanket.

* * * * *

UNITED STATES PATENT AND TRADEMARK OFFICE
CERTIFICATE OF CORRECTION

PATENT NO. : 5,183,572
DATED : February 2, 1993
INVENTOR(S) : James A. Benn

It is certified that error appears in the above-identified patent and that said Letters Patent is hereby corrected as shown below:

Title page, item [73], delete "Curtis Manufacturing
        Company, Inc., Jaffrey, N.H." and insert
        --BCB/MTC Partnership, Arlington, Mass.--.

Signed and Sealed this

First Day of March, 1994

Attest:

BRUCE LEHMAN

Attesting Officer      Commissioner of Patents and Trademarks